June 30, 1964
M. A. ELLIOTT
3,139,372
PROCESS AND PRODUCT FOR VENEER WALL
AND FLOOR COVERINGS
Filed Nov. 22, 1961
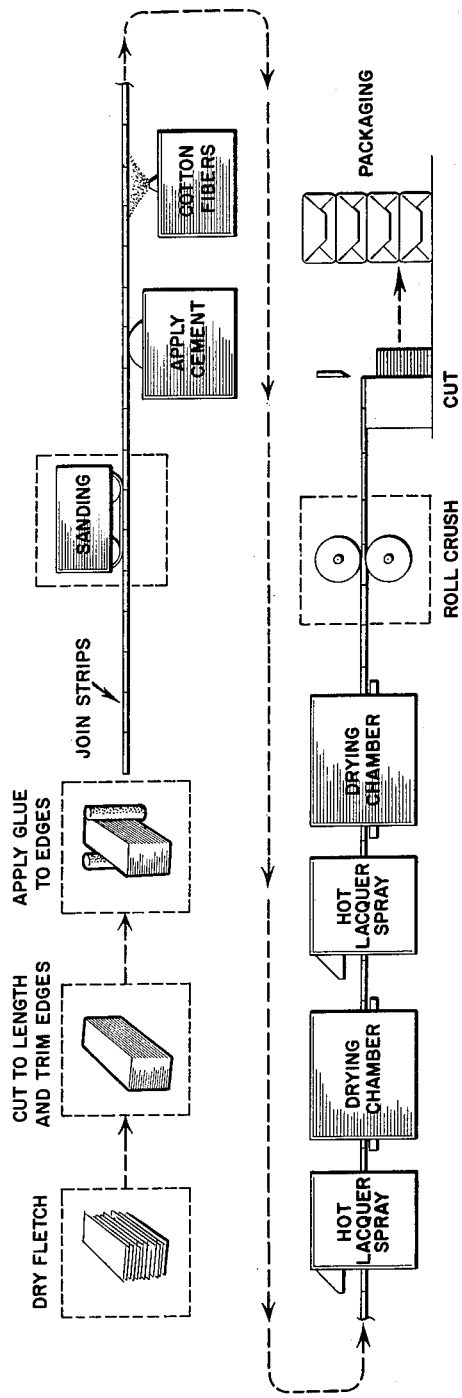
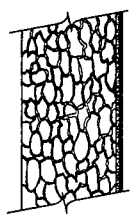
FIG. 3.
FIG. 2.
MORRIS A. ELLIOTT
*INVENTOR.*
BY *Walter G. Finch*
*ATTORNEY*

United States Patent Office 3,139,372
Patented June 30, 1964

3,139,372
PROCESS AND PRODUCT FOR VENEER WALL
AND FLOOR COVERINGS
Morris A. Elliott, Box 154A, Reisterstown, Md.
Filed Nov. 22, 1961, Ser. No. 155,244
15 Claims. (Cl. 161—164)

This invention relates generally to wall and floor coverings, and more specifically, this invention pertains to methods of processing wood and the articles produced by the processes for use as a covering material over concrete, plywood, hardboard underlayments, as well as properly prepared old wood floors or walls. This application is a continuation-in-part of U.S. patent application Serial No. 861,678, filed by application on December 23, 1959, for "Process and Product for Veneer Wall and Floor Coverings," and now abandoned.

Although this invention is utilized in connection with concrete floors, it is to be pointed out that the principles thereof are equally applicable to applying of the veneer product to plywood, hardwood underlayments, as well as properly prepared old wood floors or walls and that the invention is not limited thereto.

In the past, very little success has been had in covering concrete floors with wooden veneer type floor coverings. This has been especially true of concrete floors laid directly on the ground as in the case of basement floors.

Due to the moisture of the concrete and to humid air conditions, the earlier wooden floor coverings would soon absorb considerable moisture thereby swelling sufficiently to cause severe buckling.

The most commonly used coverings for concrete floors, namely, asphalt and vinyl tiles, though not affected by the above condition, do suffer several other deficiencies. Asphalt tiles are subject to severe denting from the pressure of furniture legs and the like and have no ability to recover after the weight is removed. On the other hand, vinyl tiles, though considerably more durable, are far more expensive.

Neither asphalt or vinyl can simulate the warm appearance of wood. Therefore, many of the basementless or slab foundation houses suffer a loss in value due greatly to the rather cold and somewhat commercial appearance of the tiling with which their floors are covered.

Further, due to their density, asphalt and vinyl floor coverings will neither absorb nor allow the passage of moisture. Therefore, any condensation which occurs between the floor covering and the concrete will accumulate in the pockets or irregularities of the concrete where it can cause mildew.

It is, therefore, an object of this invention to provide a method of processing wood as well as the product produced by the method so as to permit its use as a veneer type of floor covering on ground contact concrete floors.

It is a further object of this invention to provide a method of processing wood as well as the wood product produced by the method for floor or wall coverings which will enable the use of the many readily available, softer, and less expensive woods.

Another object of the present invention is to provide a method of processing wood as well as the wood product produced by the method which will allow the wood product to absorb a considerable amount of moisture without loss of dimensional stability.

A still further object of this invention is to provide a method of treating wood for floor or wall covering as well as the wood product produced by the method which will enable the wood to "breathe," thereby preventing the entrapment of moisture which may condensate upon the concrete surface underlying the floor or wall covering; thusly retarding the formation of mildew.

Other objects of this invention are to provide economical processes for producing veneer type of floor or wall coverings, which coverings have good qualities of wear resistance, appearance, and which are efficient and effective in operational use.

These and other objects and attendant advantages of this invention will become more apparent from the following detailed specification and the accompanying drawings in which:

FIG. 1 is a flow diagram illustrating the method for producing or manufacturing the wood type veneer floor or wall covering of the present invention;

FIG. 2 is a greatly enlarged cross-section through a piece of veneer thickness of wood at one stage of the process of manufacture of this invention; and FIG. 3 is a greatly enlarged cross-section, somewhat similar to FIG. 2, but at a further stage in the process of manufacture of this invention.

Referring now to the drawings, there is shown at the upper left of FIG. 1 a stack of "fletch" or veneer thickness wood as received from a mill. The "fletch" is stored in a conditioning room or chamber until its moisture content is brought to five (5) to six (6) percent by weight.

Following the arrows to the right of FIG. 1, it can be noted that the "fletch" is next cut to length and trimmed at its edges after which glue is applied to the edges. The individual strips of "fletch" are than joined at their glued edges to form a continuous sheet which then passes through a sander.

In the next step of the process for manufacturing the veneer type of floor or wall covering, a rubber-based cement, such as neoprene cement, is applied uniformly to the undersurface of the wood sheet after which short cotton fibers are sprayed uniformly into the still-set cement.

The sheet then progresses to a first spray hood where heated lacquer, such as cellulose acetate or equivalent material is applied uniformly to its upper surface.

After passing through a heated drying chamber, where the sheet is dried, the sheet then enters a second spray hood where a further coating of heated lacquer is applied.

The sheet then passes through a final drying chamber where it is dried and its moisture content is controlled and then continues on to pass between a pair of crushing rollers, whereby the thickness of the sheet is compressed to a preselected dimension.

Finally, the sheet is accurately cut either into strips or square tiles; for example, the continuous sheet can be cut into three-inch wide strips, or nine-inch or twelve-inch square tiles, with the three-inch size being the most widely used for flooring purposes.

After cutting, the strips or tiles are hermetically sealed in Pliofilm or combination Pliofilm-aluminum foil packages. The packages are hermetically sealed to prevent loss of the preset moisture content of the wood while in storage. Loss of the moisture content, after the strips or tiles are applied to a floor, will be of no consequence.

As previously discussed, short cotton fibers are sprayed into the rubber-based cement immediately after its application to the lower side of the sheet. The reasons for doing this will now be explained below.

When rubber cements are stretched to their elastic limits, as when peeling away a sheet that has been fastened down, the cements have a tendency to pull away under stress. This effect is minimized by the cotton fibers which tend to unify the coating of cement into an integral adhesive layer.

The cotton fibers in the cement are of further benefit at the time of cutting and packaging of the square tiles or strips in that they obviate the occasional possibility of having several of the strips or tiles adhere to one another.

When installing the strips or tiles, an area, determined by the reach of the installer, is painted with the same cement as applied to the undersurface of the wood. In this particular instance, however, the cotton fibers have been mixed into the cement. The tiles or strips are then installed before the cement dries. The solvents in the cement will sufficiently soften the cement on the underside of the strips or tiles, thus assuring a strong bond.

FIG. 2 is a cross-section, greatly enlarged, through a portion of the wood being processed, but prior to passing through the crush rollers. In its present condition, its cells, as shown by the unshaded areas, will swell generally uniformly in all directions as the wood absorbs moisture. Consequently, a floor laid of this material would tend to buckle as the cells expand.

A close examination of FIG. 3 which illustrates a portion of the sheet wood after crushing by the rollers, will reveal that the cells have been deformed or compressed parallel to the grain of the wood, resulting in an extrusion or elongation of said cells transversely to the direction of the grain of the sheet of wood, thus giving an overall elongation of the sheet of wood transversely to the direction of the grain thereof.

Simultaneously, with the crushing of the sheet of wood as indicated above, there is a stretching (elongation) of the sheet of wood, as well as a stretching of the wear finish which has been applied to the sheet of wood as previously described, resulting in a sheet of wood which can take on moisture without buckling after installation thereof.

The deformed or compressed cells of the sheet of wood shown in FIG. 3 tend to return to their original shape illustrated in FIG. 2 upon taking on moisture, to increase the thickness of the sheet of wood but not the overall width dimension thereof.

Thus, it is to be noted that the principle cause of buckling is very effectively eliminated. The crushing process by the rollers enables the wood to absorb up to approximately thirty percent of its weight in moisture without a loss of lateral dimensional stability.

Several other advantages are gained by the process of crushing of the cells by the rollers. The crushing of the cells increases the density of the wood, thereby allowing the use of the softer, less expensive woods. Further, the crushing of the cells of the wood causes microscopic cracks in both the wood and the lacquer coating, a highly beneficial condition which enables the wood to breathe, thereby discouraging the formation of mildew on its undersurface.

It is also to be pointed out that various types of woods, to name only a few, such as red oak, maple, birch walnut, and beech, can be effectively and efficiently treated by the process of this invention to obtain the unique floor or wall veneer type tiles and strips.

In addition, it might be desirable to simultaneously apply the lacquer while the cement is being applied to the upper and lower surfaces, respectively. Also, instead of utilizing a continuous strip or sheet of material, long strips of raw material can be effectively and efficiently treated by the process.

Obviously, minor changes may be made in the form of the process or the product of this invention without departing from the spirit thereof. It is not, however, desired to confine the invention to the exact form herein shown and described, but it is desired to include all such as properly come within the scope claimed.

What is claimed is:

1. A process for the manufacture of wood veneer sheet covering, comprising, forming a continuous thin sheet of wood, sanding the surfaces of said sheet of wood, applying a coating of wear finish to one surface of said sheet of wood and an adhesive material to the opposite surface thereof, drying said sheet of treated wood, and then crushing said sheet of dried treated wood parallel to the grain of said sheet of wood so that an elongation of the cells of said sheet of wood as well as an overall stretching elongation of said sheet of wood occurs transversely to the direction of the grain of said sheet simultaneously with a stretching elongation of said wear finish of said sheet of wood.

2. A process for the manufacture of wood veneer sheet covering, comprising, forming a continuous thin sheet of wood, by joining identical dry fletch sections edge to edge, sanding the surfaces of said sheet of wood, applying a coating of wear finish to one surface of said sheet of wood and an adhesive material to the opposite surface thereof, drying said sheet of treated wood, and then crushing said sheet of dried treated wood parallel to the grain of said sheet of wood so that an elongation of the cells of said sheet of wood as well as an overall stretching elongation of said sheet of wood occurs transversely to the direction of the grain of said sheet simultaneously with a stretching elongation of said wear finish of said sheet of wood.

3. A process for the manufacture of wood veneer sheet covering, comprising, applying a coating of wear finish to one surface of a continuous sheet of wood and an adhesive material to the opposite surface thereof, drying said continuous sheet of treated wood, and then crushing said sheet of dried treated wood parallel to the grain of said sheet of wood so that an elongation of the cells of said sheet of wood as well as an overall stretching elongation of said sheet of wood occurs transversely to the direction of the grain of said sheet simultaneously with a stretching elongation of said wear finish of said sheet of wood.

4. A process for the manufacture of wood veneer sheet covering, comprising, consecutively applying a coating of wear finish to one surface of a sheet of wood and an adhesive material to the opposite surface thereof, and then crushing said sheet of dried treated wood parallel to the grain of said sheet of wood so that an elongation of the cells of said sheet of wood as well as an overall stretching elongation of said sheet of wood occurs transversely to the direction of the grain of said sheet simultaneously with a stretching elongation of said wear finish of said sheet of wood.

5. A process for the manufacture of wood veneer sheet covering as recited in claim 4, and additionally sanding the surfaces of said sheet of wood prior to applying said wear finish and adhesive material thereto.

6. A process for the manufacture of wood veneer sheet covering as recited in claim 4, and additionally inserting cotton fibers into said adhesive material.

7. A process for the manufacture of wood veneer sheet covering as recited in claim 4, wherein consecutive coatings of wear finish are applied to said one surface of said sheet of wood.

8. A process for the manufacture of wood veneer sheet covering as recited in claim 7, wherein said coatings of wear finish each consist of a lacquer.

9. A process for the manufacture of wood veneer sheet covering as recited in claim 8, and additionally drying said coatings of lacquer.

10. A process for the manufacture of wood veneer sheet covering as recited in claim 4, and additionally cutting said sheet of wood into sections after said sheet of wood is crushed.

11. As an article of manufacture, a wood veneer sheet covering consisting of a sheet of wood material having a thin base, with a crushed wear finish on one side thereof and an adhesive on the opposite side thereof, said sheet of wood material having its cells elongated transversely to the direction of the grain of said sheet of material and said crushed wear finish having microscopic cracks substantially throughout.

12. As an article of manufacture, a wood veneer sheet covering consisting of an elongated flat thin sheet of wood material, with a crushed wear finish on one side thereof and an adhesive on the opposite side thereof, said sheet of wood material having crushed cells elongated transversely to the direction of the grain of said sheet of wood material and said crushed wear finish having microscopic cracks substantially throughout.

13. As an article of manufacture, a wood veneer sheet covering consisting of an elongated flat thin sheet of wood material, with a crushed wear finish on one side thereof, said sheet of wood material having its cells elongated transversely to the direction of the grain of said sheet of wood material and said crushed wear finish having microscopic cracks substantially throughout.

14. As an article of manufacture, a decorative floor tile comprising a treated laminar sheet, said sheet incorporating a veneer of wood, a crushed lacquer coating on one surface of said veneer of wood, a rubber cement coating on the opposite surface of said veneer of wood, a layer of cotton fibers bedded on said rubber cement coating, said laminar sheet having its cells elongated transversely to the direction of the grain of said laminar sheet so that said decorative floor tile is dimensionally stabilized and vented through the crushed lacquer coating.

15. As an article of manufacture, a decorative floor tile comprising a treated laminar sheet, said sheet incorporating a veneer of wood, a crushed lacquer coating on one surface of said veneer of wood, an adhesive coating on the opposite surface of said veneer of wood, a layer of fibrous material bedded on said adhesive coating, said laminar sheet having its cells elongated transversely to the direction of the grain of said laminar sheet so that said decorative floor tile is dimensionally stabilized and vented through the crushed lacquer coating.

References Cited in the file of this patent

UNITED STATES PATENTS

| | | |
|---|---|---|
| 1,343,216 | McClain | June 15, 1920 |
| 2,634,534 | Brown | Apr. 14, 1953 |
| 2,724,642 | Brown | Nov. 22, 1955 |
| 2,815,780 | Higgins | Dec. 10, 1957 |